(Model.)
A. RISCHOW.
Pocket Knife.
No. 242,985. Patented June 14, 1881.
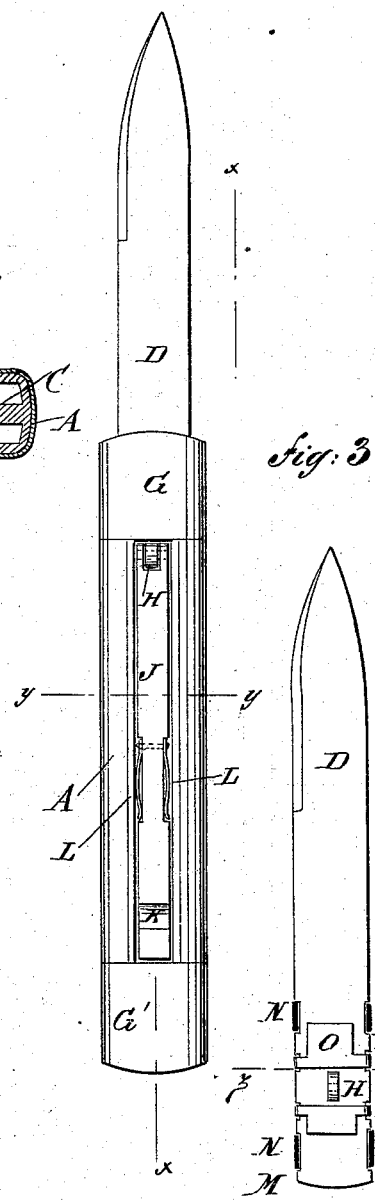
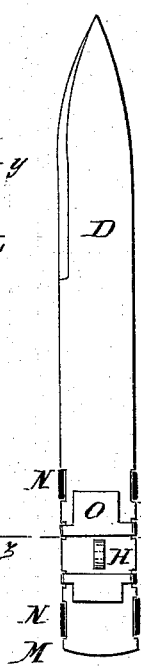
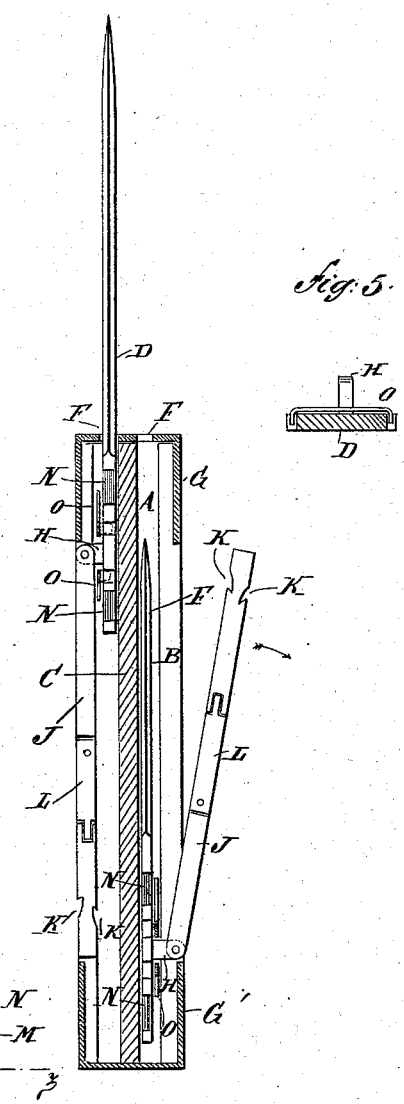
WITNESSES:
Chas. Nida
C. Sedgwick
INVENTOR:
A. Rischow
BY Munn & Co
ATTORNEYS.

UNITED STATES PATENT OFFICE.

AUGUST RISCHOW, OF ELIZABETH, NEW JERSEY, ASSIGNOR TO HIMSELF AND ANTON BRANDNER, OF SAME PLACE.

POCKET-KNIFE.

SPECIFICATION forming part of Letters Patent No. 242,985, dated June 14, 1881.

Application filed April 16, 1881. (Model.)

*To all whom it may concern:*

Be it known that I, AUGUST RISCHOW, of Elizabeth, in the county of Union and State of New Jersey, have invented a new and Improved Pocket-Knife, of which the following is a full, clear, and exact description.

The object of my invention is to prevent the blades of pocket-knives from being raised accidentally and from folding or collapsing while the knife is being used.

The invention consists in a handle with longitudinal slots in which bars fit, which are pivoted to the lower ends of the knife-blades, which slide between suitable guides in the handle, and are provided with suitable packing. When the outer end of one of the pivoted bars is raised out of the slot this bar can be used to push the blade out of the end of the handle or to draw it into the handle, this bar fitting into the slot, and thus serving as a lock to keep the blade in the desired position within the handle or projecting from the same.

In the accompanying drawings, Figure 1 is a side elevation of my improved pocket-knife, showing one blade projecting from the end of the handle. Fig. 2 is a cross-sectional elevation of the same on the line $x\ x$, Fig. 1. Fig. 3 is a detail longitudinal elevation of the sliding blade, showing the packing. Fig. 4 is a cross-sectional view of the handle on the line $y\ y$, Fig. 1. Fig. 5 is a cross-sectional view of the blade on the line $z\ z$, Fig. 3.

The knife-handle A is provided with longitudinal slots B B in the broad sides, and is divided into two compartments by a longitudinal partition, C, which is parallel with the wide sides of the handle. The blades D and E each fit into one of these compartments in the handle, and are arranged to slide in the same and through corresponding apertures or slots F F in the upper cap, G, of the handle.

The blades are provided at the lower end with a lug, H, projecting from the outer side into the slots B, and to each lug a bar, J, of the length of the slot B, between the edges of the caps G G', is pivoted. This bar J is provided with a notch, K K, in the upper and lower surface, at the outer end, and is also provided with two flat bow-springs, L, at or about the middle.

The blades D and E are provided with recesses M M in the edges, near the lower end, and packing-strips N N, of rubber, fit into the recesses, as shown in Fig. 3.

Packing-plates O O rest on the outer surface of the blades and are clamped over the edges, as shown in Figs. 3 and 5.

The strips O and the rubber packing N cause an easy and gentle movement of the sliding blade.

The operation is as follows: The bar J is drawn outward, as shown in Fig. 2, and is used as a handle to push the blade upward and out of the end of the handle. The lug H will rest against the edge of the upper cap, G, and the bar J is folded down in the slot B, as shown on the left-hand side of Fig. 2. This bar rests in its slot B when its blade projects from the handle, or when it is contained within the same, and thus this bar serves to lock the blade in its various positions, for the blade cannot be moved until the end of the bar J is drawn or raised out of the slot B.

The springs L prevent the bars J from dropping out of the slots.

Having thus fully described my invention, what I claim as new, and desire to secure by Letters Patent, is—

1. A pocket-knife made, substantially as herein shown and described, with sliding blades having a hinged bar pivoted thereto for moving them, as set forth.

2. In a pocket-knife, the combination, with the handle A, having longitudinal slots B in its sides, of the blade D and the bar J, pivoted thereto and fitting in the slot B, substantially as herein shown and described, and for the purpose set forth.

3. In a pocket-knife, the combination, with the handle A, having longitudinal slots B in its sides, of the blade D, the bar J, pivoted thereto, and of the flat bow-springs L L, substantially as herein shown and described, and for the purpose set forth.

4. In a pocket-knife, the combination, with the handle A, of the sliding blade D, provided with the recesses M, and of packing-strips N, of rubber, substantially as herein shown and described, and for the purpose set forth.

AUGUST RISCHOW.

Witnesses:
MORRIS KOESTLER,
AUGUST WINKLER.